Figure 1:
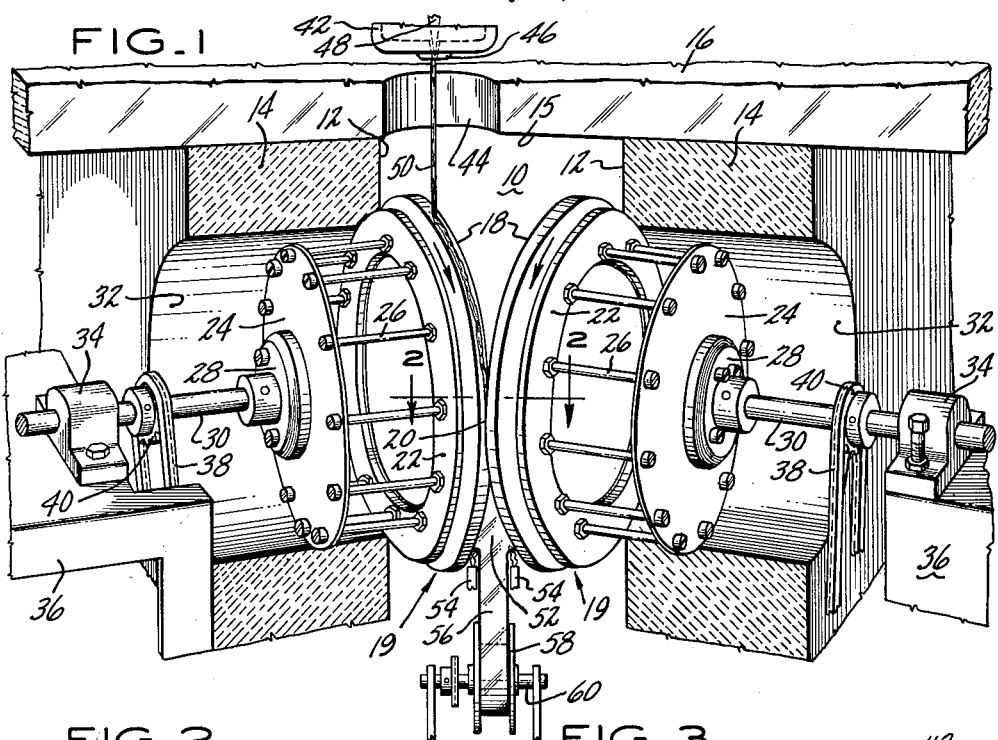

June 6, 1961 E. K. LANE, JR 2,986,844
APPARATUS FOR MAKING GLASS FILM
Filed July 13, 1959

TO COLLECTION UNIT

INVENTOR
EDWARD K. LANE, JR.
BY Teller & McCormick
ATTORNEYS

United States Patent Office 2,986,844
Patented June 6, 1961

2,986,844
APPARATUS FOR MAKING GLASS FILM

Edward K. Lane, Jr., Claremont, Calif., assignor to Emhart Manufacturing Company, Hartford, Conn., a corporation of Delaware
Filed July 13, 1959, Ser. No. 826,643
7 Claims. (Cl. 49—17)

The invention relates to glass forming apparatus and more particularly to apparatus for forming a thin glass film.

The general object of the invention is to provide apparatus for forming a thin glass film suitable for use as a flake or sheet laminate. More particularly, an object of the invention is to provide apparatus for producing a thin glass film by stretching a charge of molten glass between diverging members. Another object of the invention is to provide apparatus for stretching molten glass into a thin film that will operate continuously.

In brief, the apparatus comprises two oppositely disposed rotatable surfaces which are positioned closely adjacent to each other at one point. The surfaces are preferably formed as surfaces of revolution, especially as rectilinear surfaces of revolution, such as cones or cylinders or the like, and constitute the peripheral portions of two members which are rotatable about diverse axes, that is, about axes which are not coincident. While the axes of the rotatable members may be parallel, it is preferred that the axes be inclined and that the surfaces be parallel and overlap each other. Suitable glass feeding means are provided whereby a continuous supply of molten glass may be deposited on, and in the space between, the oppositely disposed surfaces on the rotatable members. The members are rotated in opposite directions at the same speed so that the oppositely disposed surfaces are moved in the same general direction at the point of adjacency and the diverseness of the axes of the rotatable members and the opposite rotation thereof causes the surfaces to converge toward and diverge from the point of adjacency. Inasmuch as the surfaces are rotated at the same speed the only relative motion between the surfaces is laterally. The relative lateral movement between the oppositely disposed surfaces causes the molten glass to stretch into a thin sheet of film.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Figure 2:
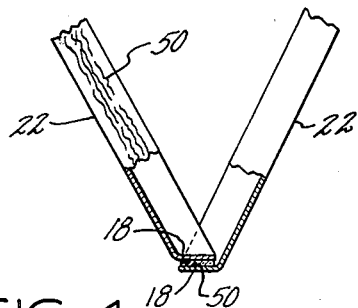
Figure 3:
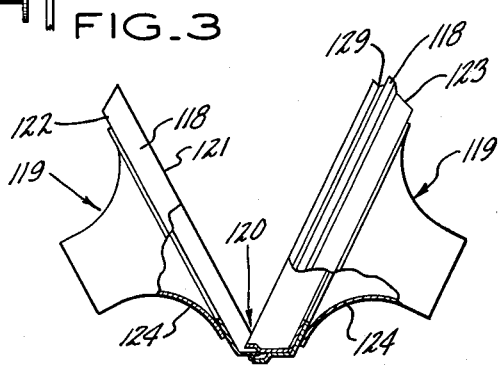
Figure 4:
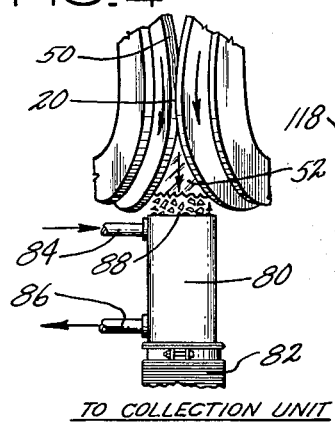
Figure 5:
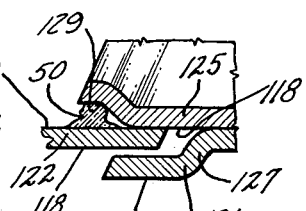
Figure 6:
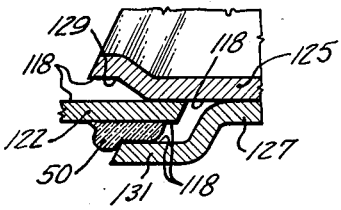

Of the drawing:

FIG. 1 is a perspective view, partly in section, showing apparatus constructed in accordance with the teachings of the invention, FIG. 2 is a partial view, partly in section, taken along the line 2—2 in FIG. 1 looking in the direction of the arrows, FIG. 3 is a plan view, partly in section, of two rotatable members constructed in slightly different form than in FIG. 1, FIG. 4 is a fragmentary elevational view showing apparatus for harvesting the film in the form of flakes, FIG. 5 is an enlarged sectional view of a portion of FIG. 3, and FIG. 6 is an enlarged sectional view similar to FIG. 5 showing an alternative feeding position for the molten glass.

Referring first to FIG. 1, there is shown an interior chamber 10 formed in part by the inner surfaces 12 of thick vertical walls of insulation material 14 and in part by the inner surfaces 15 of similar sheets of insulation material 16 horizontally disposed at the top and the bottom of the chamber, the top sheet only being shown. The chamber 10 is maintained at a high temperature by suitable heating means (not shown) positioned within the chamber.

Also within the chamber 10 are the rims or annular flanges of two rotatable members 19, 19 which rotate about diverse axes, that is, about axes which are not coincident and which are preferably inclined to each other and intersect. The rims of the members 19, 19 are closely adjacent each other at one point 20 and preferably overlap each other at that point. Inner and outer surfaces of the rims which are opposed at the point 20 of overlap are designated 18, 18, these being surfaces of revolution which are preferably parallel at the point 20, and the rims or flanges are frusto-conically shaped to provide this relationship.

As shown in FIG. 1, each rim or annular flange 22 is secure, at a spaced distance, to a flange support plate 24 by means of a plurality of fastening rods 26. Each flange support plate 24, in turn, is secured to a disc 28 fixed to the end of a shaft 30 centrally disposed with respect to a generally cylindrical access opening 32 formed in each insulating side wall 14 of the chamber 10, and each shaft 30 is journalled in a bearing block 34 mounted on a supporting frame 36. Rotation of each shaft 30 is effected through an endless chain power drive 38 that serves to rotate a sprocket wheel 40 fixed to the shaft 30. The flange support plate 24 is protected from the heat of the interior chamber 10 by a cylindrical block of insulation material positioned between the flange portion and the support plate; however, for the sake of clarity in illustrating the structure of the rotatable members, this insulation material has been omitted from the drawing.

A reservoir 42 for molten glass and the outlet orifice 46 thereof are positioned immediately above an opening 44 in the top sheet of insulation material 16. As is customary, the orifice 46 of the reservoir 42 cooperates with a reciprocable plunger 48 to control the flow of molten glass downwardly through the orifice. As shown, the orifice 46 of the reservoir 42 is positioned to continuously deposit a stream of molten glass 50 upon one of the rotatable surfaces 18 near its uppermost point. Rotation of that rotatable surface in a clockwise direction, as viewed in FIG. 1, brings the molten glass to the point 20 at which the oppositely disposed surfaces 18, 18 are closely adjacent. Inasmuch as the clearance between the overlapping surfaces 18, 18 at this point is relatively narrow the molten glass 50 engages both of the surfaces and adheres thereto and fills the space therebetween.

The members 19, 19 are rotated simultaneously at the same speed, but in opposite directions; the right hand member (as shown in FIG. 1) rotating in a counterclockwise direction and the lefthand member rotating in a clockwise direction. This opposite rotation of the members 19, 19 causes the surfaces 18, 18 to move in the same general downward direction in the area of adjacency, first converging toward each other then gradually diverging away from each other. As will be observed in FIGS. 1 and 2, the direction of divergence is generally parallel to the said surfaces for a portion of the length thereof. The gradual divergence of the surfaces 18, 18 causes the surfaces 18, 18 to move laterally with respect to each other and to stretch the glass 50 in a direction generally parallel with the said surfaces and into a thin flat film 52 which becomes progressively wider and thinner the greater the distance between the rotatable surfaces 18, 18.

The film 52 thus produced may be harvested either as a continuous sheet or immediately broken up into discrete flakes. As is shown schematically in FIG. 1 burners 54, 54 are positioned closely adjacent the rotatable surfaces 18, 18 at a short distance below the initial stretching point 20. The heat from the burners 54, 54 melts the glass at the surfaces 18, 18 and causes the glass to pull away from the members 19, 19. The continuous strip 56 thus formed is rolled onto a drum 58 mounted on a rotatable shaft 60 positioned below the members 19, 19.

Suitable apparatus for collecting the glass in the form of discrete flakes is shown in FIG. 4. The apparatus comprises a collection unit 80 to which there is attached suction means such as a tube 82 from a suitable source of vacuum (not shown). The collection unit 80 is positioned a short distance below the point 20 and below the film 52 and is provided with an inlet conduit 84 and outlet conduit 86 for cooling water. As the vacuum pulls the glass film 52 from the members 19, 19 the film breaks into discrete flakes 88 which fall into the collection unit 80.

Alternatively, the rotatable members may be constructed as shown in FIGS. 3, 5 and 6 wherein they are designated by the rererence numerals 119, 119 and wherein the fllange support plates 124 are hollow and trumpet-shaped and the outer end portions 121, 123 thereof vary slightly in form. One end portion 121 (the lefthand end portion as viewed in FIG. 3) comprises a single annular frusto-conically shaped flange 122 having peripheral rotatable surfaces of revolution 118, 118. The other end portion 123 (the righthand end portion of (FIG. 3) comprises inner and outer frusto-conically shaped flanges 125, 127. The inner flange 125 of end portion 123 is longer than the outer flange 127 and is provided with a groove 129 adjacent the outer edge thereof. The outer flange 127 lies partially in face to face engagement with the inner flange 125 but is provided with a bent outer edge portion 131 spaced from the inner flange 125. The outer peripheral surface of the inner flange 125 and the inner peripheral surface of the bent outer edge portion 131 of outer flange 127 serve as the rotatable surfaces of revolution 118, 118.

Members 119, 119 are shown with their axes inclined and intersecting so as to bring their peripheral surfaces 118, 118 closely adjacent at one point 120 and to position flange 122 within the space between the bent portion 131 of outer flange 127 and the inner flange 125. This arrangement permits the molten glass 50 to be fed to the point 20 either in the space between the flange 122 and the groove 129 on the inner flange 125 (FIG. 5) or in the space between the flange 122 and the outer bent portion 131 of outer flange 127 (FIG. 6). The bent edge portion 131 also serves as a keeper for the flange 122, that is, as a limiting or stop member whereby movement of the flange 122 away from the flange 125 can be controlled. Thus, premature rupture of the glass film arising from excessive misalignment of the flanges is prevented.

The invention claimed is:

1. Apparatus for making glass film comprising two members rotatable about axially inclined and intersecting axes, one of said members having its peripheral portions formed as two spaced flanges, the other of said two members having its peripheral portions formed as a single flange, said single flange being positioned between said two spaced flanges at one point, means for depositing molten glass on, and in the space between, said flanges at the one point, and means for simultaneously rotating the members in opposite directions and at the same speed to cause points on said respective surfaces to diverge from the said one point and stretch the glass into film.

2. Apparatus for making glass film comprising two members rotatable about inclined axes and having peripheral surfaces formed as surfaces of revolution and which are in closely adjacent parallel overlapping relation at one point, means for depositing molten glass on and between said surfaces at said one point in a condition wherein it adheres to said surfaces, and means for simultaneously rotating said members in opposite directions at equal speeds whereby to cause points on said respective surfaces to diverge from said point of adjacency and stretch the glass into a thin film therebetween.

3. Apparatus for making glass film comprising a pair of rotatable members each of which is provided with an annular generally frusto-conical rim, means supporting said members for rotation about inclined intersecting axes with said rims overlapping at one point with the inner surface of one rim in closely adjacent but spaced parallel relationship with the outer surface of the other rim, said inner and outer rim surfaces diverging from said one point in a direction generally parallel to both of said surfaces for at least a portion of their length, means for continuously supplying molten glass to the space between said inner and outer rim surfaces at said one point in a condition wherein it adheres to said surfaces, and means for rotating said members so that points on said inner and outer rim surfaces move in the same general direction and diverge from said one point at equal speeds whereby to continuously stretch molten glass therebetween in a direction generally parallel therewith and to produce a thin glass film.

4. Apparatus for making glass film comprising a pair of rotatable members each of which is provided with an annular generally frusto-conical rim, means supporting said members for rotation about inclined intersecting generally horizontal axes with said rims overlapping at one point with the inner surface of one rim in closely adjacent but spaced parallel relationship with the outer surface of the other rim, said inner and outer rim surfaces diverging away from and above and below said one point in a direction generally parallel to both of said surfaces for at least a portion of their length, means for continuously supplying molten glass to said outer rim surface above said point in a condition wherein it adheres to said surface, and means for rotating said members so that points on said inner and outer rim surfaces converge downwardly toward and diverge from said one point at equal speeds whereby to continuously supply molten glass to and fill the space between said surfaces at said one point and to stretch molten glass between said surfaces in a direction generally parallel with the surfaces to produce a thin glass film.

5. Apparatus for making glass film comprising a pair of rotatable members each of which is provided with an annular generally frusto-conical rim, means supporting said members for rotation about inclined intersecting generally horizontal axes with said rims overlapping at one point with the inner surface of one rim in closely adjacent but spaced parallel relationship with the outer surface of the other rim, said inner and outer rim surfaces diverging away from and above and below said one point in a direction generally parallel to both of said surfaces for at least a portion of their length, means for continuously supplying molten glass to said outer rim surface above said point in a condition wherein it adheres to said surface, means for rotating said members so that points on said inner and outer rim surfaces converge downwardly toward and diverge from said one point at equal speeds whereby to continuously supply molten glass to and fill the space between said surfaces at said one point and to stretch molten glass between said surfaces in a direction generally parallel with the surfaces to produce a thin glass film, and means for removing the glass film from said rim surfaces.

6. Apparatus for making glass film comprising a pair of rotatable members each of which is provided with an annular generally frusto-conical rim, means supporting said members for rotation about inclined intersecting generally horizontal axes with said rims overlapping at one point with the inner surface of one rim in closely adjacent but spaced parallel relationship with the outer surface of the other rim, said inner and outer rim surfaces diverging away from and above and below said one point in a direction generally parallel to both of said surfaces for at least a portion of their length, means for continuously supplying molten glass to said outer rim surface above said point in a condition wherein it adheres to said surface, means for rotating said members so that points on said inner and outer rim surfaces converge downwardly toward and diverge from said one point at equal speeds whereby to continuously supply molten glass to and fill the space between said surfaces at said one point and to stretch molten glass between said surfaces in a direction generally parallel with the surfaces to produce a thin glass film, heating means for effecting the release of glass film from said inner and outer rim surfaces, and continuously rotatable means to receive the film released from said surfaces.

7. Apparatus for making glass film comprising a pair of members rotatable about diverse axes and having peripheral surfaces formed as surfaces of revolution, said peripheral surfaces of the members being closely adjacent each other at one point, means for depositing molten glass on and in the space between said surfaces at said one point, means for simultaneously rotating the members in opposite directions at the same speed to cause points on said surfaces to diverge from the said one point and to stretch the molten glass into a film, and suction means for stripping the film from the rotatable members.

References Cited in the file of this patent

UNITED STATES PATENTS

| | | |
|---|---|---|
| 1,565,319 | Fowle | Dec. 15, 1925 |
| 1,697,104 | Byrnes | Jan. 1, 1929 |
| 2,251,727 | Wellech et al. | Aug. 5, 1941 |
| 2,276,615 | Hazelett | Mar. 17, 1942 |
| 2,342,891 | Powers | Feb. 29, 1944 |
| 2,520,169 | Powell | Aug. 29, 1950 |
| 2,594,799 | Powell | Apr. 29, 1952 |
| 2,632,920 | Koehler | Mar. 31, 1953 |
| 2,700,176 | Graybeal | Jan. 25, 1955 |
| 2,780,889 | Fulk | Feb. 12, 1957 |
| 2,880,551 | Martuscello et al. | Apr. 7, 1959 |